(12) United States Patent
Fukuoka

(10) Patent No.: US 11,010,900 B2
(45) Date of Patent: May 18, 2021

(54) INFORMATION PROCESSING METHOD, INFORMATION PROCESSING APPARATUS, AND STORAGE MEDIUM

(71) Applicant: CANON KABUSHIKI KAISHA, Tokyo (JP)

(72) Inventor: Sho Fukuoka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 208 days.

(21) Appl. No.: 16/200,452

(22) Filed: Nov. 26, 2018

(65) Prior Publication Data
US 2019/0172208 A1    Jun. 6, 2019

(30) Foreign Application Priority Data

Dec. 4, 2017  (JP) .............................. JP2017-232932

(51) Int. Cl.
| | |
|---|---|
| *G06T 7/11* | (2017.01) |
| *G06K 15/02* | (2006.01) |
| *G06T 1/20* | (2006.01) |
| *G06T 5/00* | (2006.01) |
| *G06T 11/60* | (2006.01) |

(52) U.S. Cl.
CPC ............ *G06T 7/11* (2017.01); *G06K 15/1872* (2013.01); *G06T 1/20* (2013.01); *G06T 5/003* (2013.01); *G06T 11/60* (2013.01); *G06T 2207/10024* (2013.01)

(58) Field of Classification Search
CPC . G06T 7/11; G06T 5/003; G06T 11/60; G06T 1/20; G06T 2207/10024; G06K 15/1872
See application file for complete search history.

(56) References Cited

U.S. PATENT DOCUMENTS

| | | | | |
|---|---|---|---|---|
| 2007/0070473 | A1* | 3/2007 | Lu ........................... | G06T 11/60 358/537 |
| 2008/0273110 | A1* | 11/2008 | Joza ....................... | H04N 5/235 348/333.05 |
| 2010/0149563 | A1* | 6/2010 | Otomaru .............. | H04N 1/6052 358/1.9 |
| 2010/0157341 | A1* | 6/2010 | Mori ..................... | G06F 3/1208 358/1.9 |

FOREIGN PATENT DOCUMENTS

JP    2017-005626 A    1/2017

\* cited by examiner

*Primary Examiner* — Jaime M Holliday
(74) *Attorney, Agent, or Firm* — Canon U.S.A., Inc. IP Division

(57) ABSTRACT

The present disclosure is directed to a technique for outputting images so that a user can easily compare the image on which image processing is executed and the image on which image processing is not executed. In the technique, a first image of a region of an output target in a predetermined image on which predetermined image processing is not executed and a second image of the region of the output target in the predetermined image on which the predetermined image processing is executed are output by an output apparatus so that the first image and the second image are output and arranged in an output layout according to a shape of the region of the output target.

14 Claims, 11 Drawing Sheets

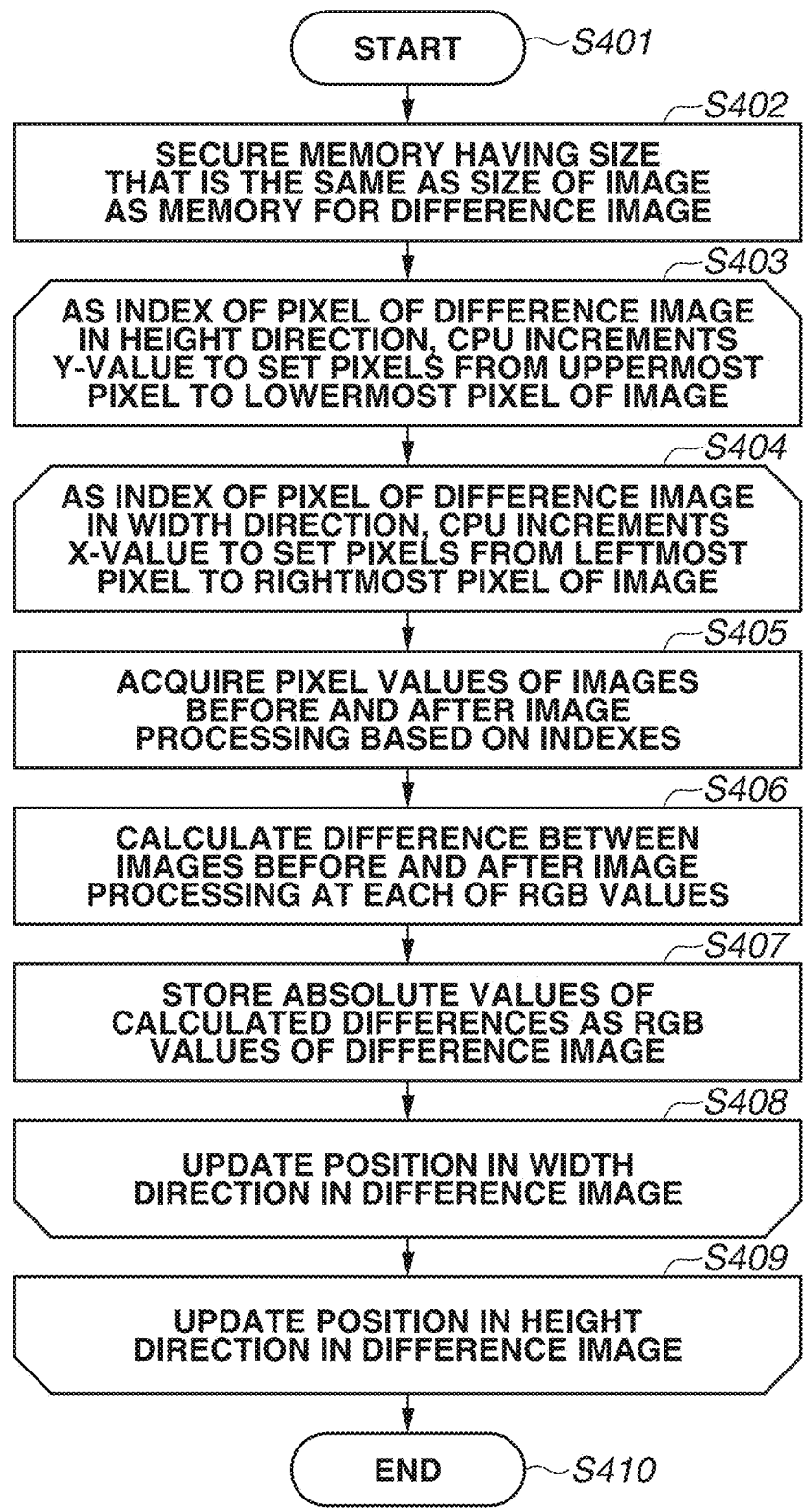

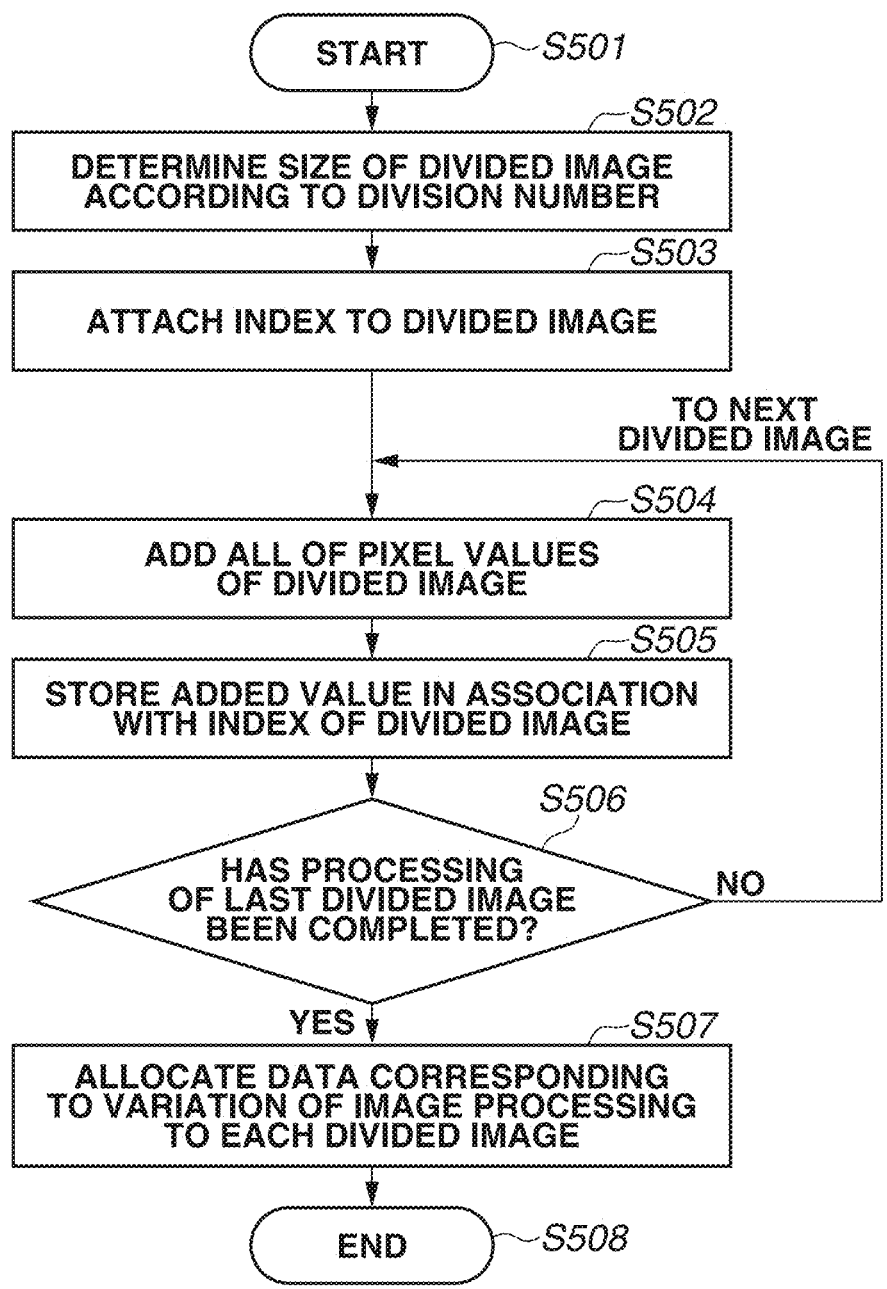

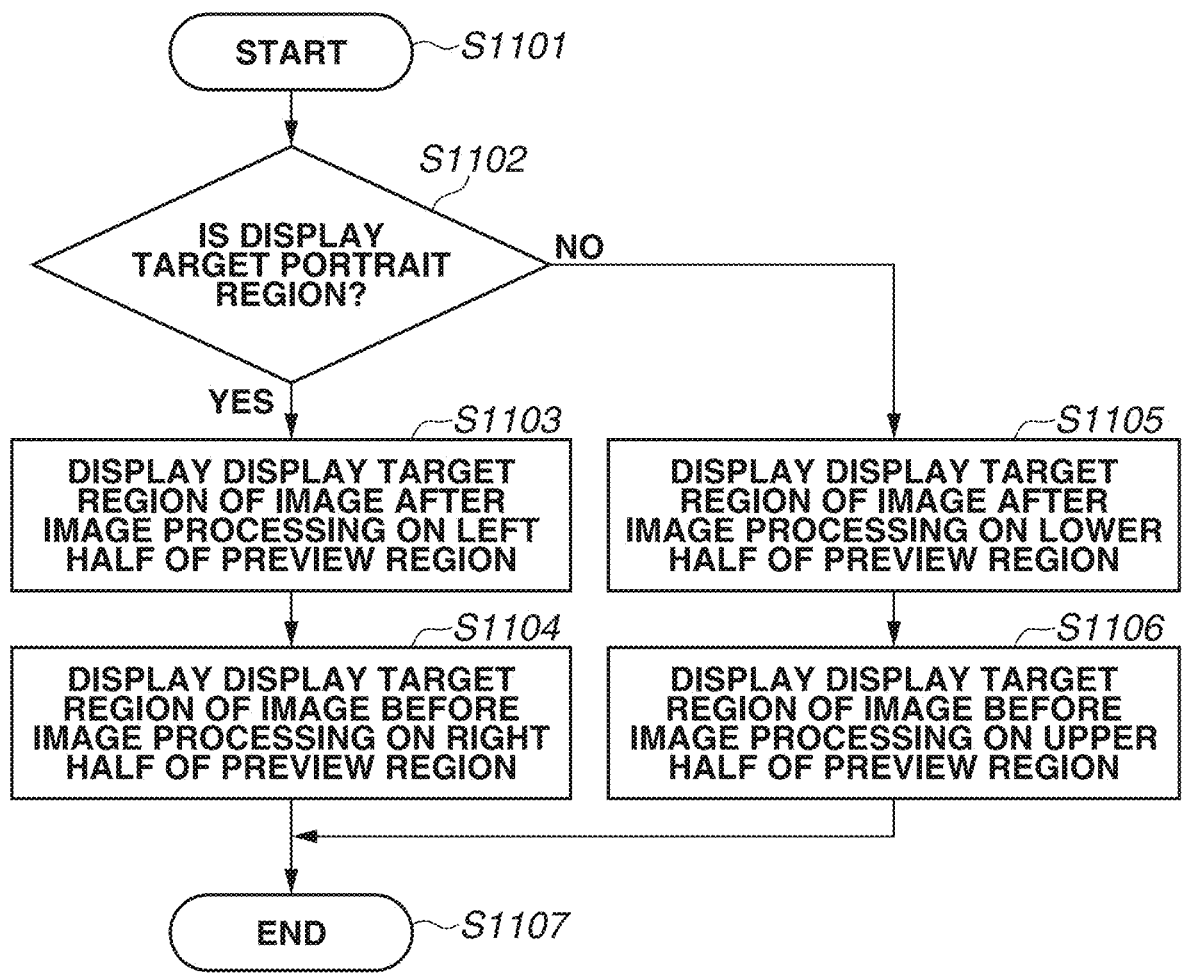

INFORMATION PROCESSING METHOD, INFORMATION PROCESSING APPARATUS, AND STORAGE MEDIUM

BACKGROUND

Field of the Disclosure

The present disclosure relates to an information processing method for outputting information about a variation caused by image processing executed on a predetermined image from an output apparatus, an information processing apparatus, and a storage medium.

Description of the Related Art

In recent years, due to popularization of a digital camera, a smartphone having a camera function, or a high-definition display, there has been an increase in the number of users who perform image processing on images. Therefore, there is provided a display method which enables a user to check the effect of the image processing appearing on the image.

Japanese Patent Application Laid-Open No. 2017-005626 discusses a method of determining a region in an image appropriate for checking an effect of image processing.

In a case where a user checks an effect of image processing as described in Japanese Patent Application Laid-Open No. 2017-005626, there is a case where the user would like to compare the images before and after the image processing through an output result output from an output apparatus. In this case, the output result may desirably be output in an layout in which the user can easily compare the images before and after the image processing.

SUMMARY

Therefore, the present disclosure is directed to a technique for outputting images so that a user can easily compare an image on which image processing is executed and an image on which image processing is not executed.

According to an aspect of the present invention, an information processing method, performed by at least one processor, for outputting an image from an output apparatus includes executing, through image processing, predetermined image processing on a predetermined image, determining a region of an output target in the predetermined image based on information about a variation caused by the predetermined image processing executed on the predetermined image in the image processing, and outputting, from the output apparatus through output control, a first image of the region of the output target determined by the determining in the predetermined image on which the predetermined image processing is not executed through the image processing, and a second image of the region of the output target in the predetermined image on which the predetermined image processing is executed through the image processing, wherein, in the output control, the first image and the second image are output so that the first image and the second image are arranged to be output from the output apparatus in an output layout according to a shape of the region of the output target determined by the determining.

Further features of the present invention will become apparent from the following description of exemplary embodiments with reference to the attached drawings.

BRIEF DESCRIPTION OF THE DRAWINGS

FIG. 4 is a flowchart illustrating processing for generating a difference image.

FIG. 5 is a flowchart illustrating processing for calculating a variation before and after image processing.

FIG. 11 is a flowchart illustrating control processing for displaying a region of a display target.

DESCRIPTION OF THE EMBODIMENTS

Hereinafter, an exemplary embodiment of the present invention will be specifically and precisely described with reference to the appended drawings. In the below-described exemplary embodiment, the same reference numbers will be applied to the same constituent elements through the entire drawings.

Figure 1:
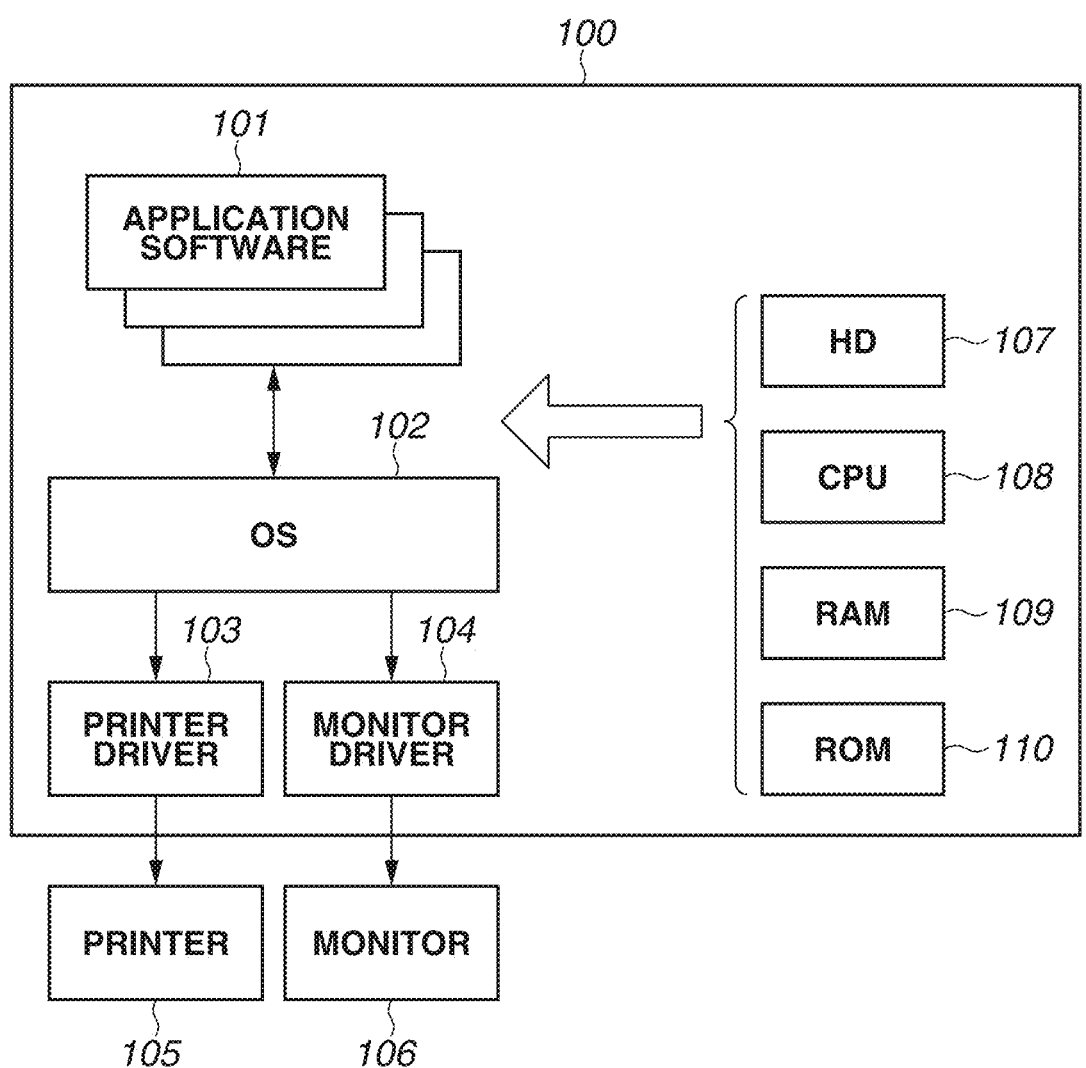
FIG. 1 is a block diagram illustrating an example of an information processing system according to a present exemplary embodiment.

FIG. 1 is a diagram illustrating an example of an information processing system of the present exemplary embodiment. A host computer 100 serving as an information processing apparatus of the present exemplary embodiment is connected to a printer 105 serving as a printing apparatus and a monitor 106 serving as a display apparatus. The host computer 100 includes an application software 101 such as a word processing application, a spreadsheet application, or an internet browser. A group of various rendering processing instructions (e.g., an image rendering instruction, a text rendering instruction, and a graphics rendering instruction), which represents an output image, issued by the application software 101 is input to a monitor driver 104 via an operating system (OS) 102. When printing is to be executed, the group of rendering instructions is also input to a printer driver 103 via the OS 102. The printer driver 103 is software which processes the group of rendering instructions to create print data and executes printing through the printer 105. The monitor driver 104 is software which processes the group of rendering instructions to display an image on the monitor 106.

The host computer 100 includes a central processing unit (CPU) 108, a hard disk (HD) 107, a random access memory (RAM) 109, and a read only memory (ROM) 110 as a hardware configuration for realizing the functions of the above-described software. Programs corresponding to the respective pieces of software 101 to 104 in FIG. 1 are stored in the hard disk 107 or the ROM 110. Then, the CPU 108 reads out the programs to the RAM 109 and executes the programs to be able to realize the functions of the respective pieces of software 101 to 104.

Further, the host computer 100 includes an operation unit (not illustrated), or an external operation device is connected to the host computer 100. The CPU 108 receives user instructions input to the operation unit or the operation device to execute various types of processing according to the instructions. For example, a mouse and a keyboard are included in the operation unit or the operation device. Alternatively, the host computer 100 may include a touch panel in which the operation unit or the operation device and the monitor 106 are integrally configured.

Through the above-described configuration, for example, optional application software having a printing function is installed in the host computer 100, and the monitor 106 and the printer 105 are controlled through the processing executed by the CPU 108. Further, the application software 101 uses various types of data to create output image data. This "various types of data" includes text data classified as a text such as a character, graphics data classified as graphics such as a figure, and image data classified as a photographic image. Then, the CPU 108 can output the created output image data to the monitor 106, and display the output image data on the monitor 106. Further, a printing output request is transmitted to the OS 102 from the application software 101. Then, a group of rendering instructions consisting of a text rendering instruction about text data, a graphics rendering instruction about graphics data, and an image rendering instruction about image data is issued to the OS 102. Based on the data rendered by the OS 102 according to the group of rendering instructions, print data is created by the printer driver 103 and transmitted to the printer 105, so that printing is executed.

Figure 2A:
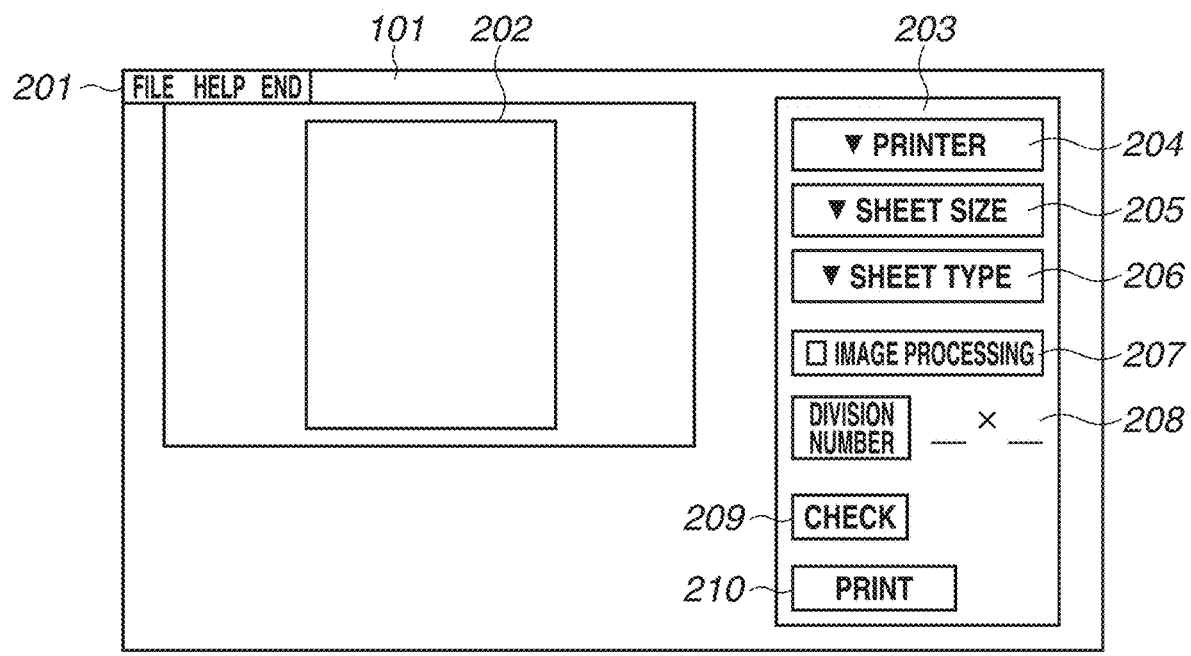
FIGS. 2A and 2B are diagrams illustrating examples of a screen displayed by an application software.
Figure 2B:
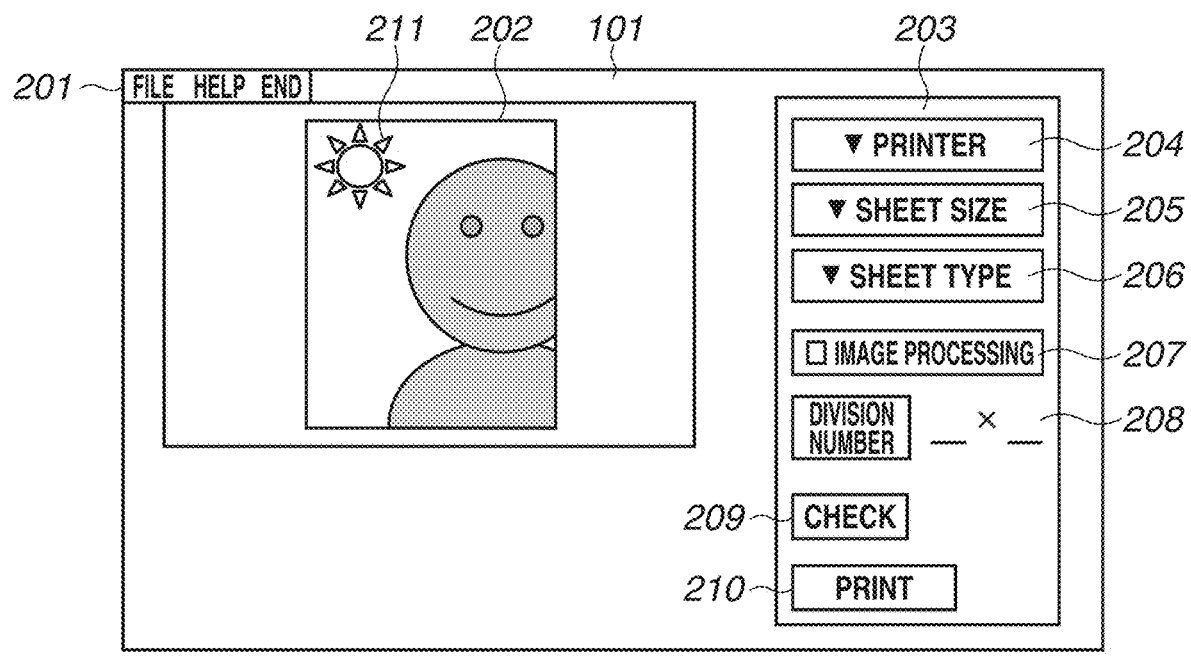

FIGS. 2A and 2B are diagrams illustrating examples of screens displayed on the application software 101. The screens in FIGS. 2A and 2B are displayed on the monitor 106 when the CPU 108 executes the application software 101 and the monitor driver 104.

FIG. 2A is a diagram illustrating an example of a screen for inputting an editing instruction of the image. The screen in FIG. 2A includes various display items 201 to 210. A menu operation portion 201 is a display item which enables a user to end the application software 101, add an image to a page, or display help information. A preview region 202 displays the image as an editing target and a variation in a pixel value caused by the image processing. FIG. 2B is a diagram illustrating a state where an image 211 is displayed on the preview region 202.

A printer selection pulldown 204, a sheet size selection pulldown 205, and a sheet type selection pulldown 206 are respective display items which allow a user to select a printer used for printing, a sheet size, and a sheet type. Selection candidates settable thereto are displayed on each of the display items 204 to 206, so that the user selects a setting value from among the selection candidates.

An image processing application checkbox 207 is a display item which allows a user to specify whether to apply the image processing on the image as an editing target. Further, image processing for correcting variations of image quality caused by a printer will be described as an example of the image processing according to the present exemplary embodiment. There is a case where brightness, color, or sharpness of an original image varies because of a printing characteristic of a printer. In the above-described image processing, image processing relating to brightness, color, or sharpness is previously executed on the original image according to the characteristic of the variation, so that the printing characteristic of the printer can be offset thereby. For example, in a case where brightness of the image is reduced when the image is printed by the printer, image processing for increasing the brightness of the original image is executed according to a reduction level of the brightness. By executing printing in the above-described state, it is possible to express the original brightness. In addition, a type or an intensity of the image processing is changed as appropriate according to the character or the print setting of the printer that executes printing.

A division number input region 208 is a display item for specifying a number of regions for measuring the variation in the image caused by the image processing. In the present exemplary embodiment, at each of regions of a number specified by the division number input region 208, a variation is measured through the image processing, and below-described display processing is executed according to the measurement result. In addition, the division number input region 208 accepts inputs of optional numerical values with respect to division numbers in the width direction and the height direction of the image.

A user presses a check button 209 to input an instruction for a display for checking the variation in the image caused by the image processing. When the check button 209 is pressed, the CPU 108 measures a variation of the pixel value of the image according to the contents set to the division number input region 208. Then, the CPU 108 displays a partial image as one part of the image 211 before the image processing and an image of the part identical to the one part, of the image 211 after the image processing, on the preview region 202 according to the measured variation. Specifically, the CPU 108 measures a variation of the pixel value caused by the image processing at each of the regions of the image 211 divided according to the setting input to the division number input region 208. Then, from among the plurality of regions, the CPU 108 automatically specifies a region from which a large variation is measured, in which an influence of the image processing can be easily grasped, and displays partial images before and after the image processing with respect to the specified region. Further, according to a shape of the region, in which the influence of the image processing can be easily grasped, automatically specified as described above the CPU 108 automatically determines a display layout of the partial images to enable the user to easily compare the partial images. Details of the processing executed by the CPU 108 will be described below.

The user presses a print button 210 to input an instruction for printing the image. For example, if the print button 210 is pressed when the image is displayed on the preview region 202, the CPU 108 executes the printer driver 103 to cause the printer 105 to print the image. In the printing processing, the CPU 108 determines whether to apply the image processing of the image to the printing processing according to the contents set to the image processing application checkbox 207 when the print button 210 is pressed. Then, the image on which the image processing is executed or the image on which the image processing is not executed is transmitted to the printer 105 according to the determination result. Specifically, with respect to the printer selected at the printer selection pulldown 204 when the print button 210 is pressed, the CPU 108 transmits a printing instruction together with the print settings made to the sheet size selection pulldown 205 and the sheet type selection pulldown 206.

Further, in the present exemplary embodiment, the division number input region 208 and the check button 209 are controlled to be inoperable when the image processing application checkbox 207 is not ticked. However, depending on the embodiment, the above control does not have to be executed.

Hereinafter, processing executed when the check button 209 is pressed in a state where a tick mark and numerical values, respectively, have been input to the image processing application checkbox 207 and the division number input region 208 will be described. In the present exemplary embodiment, when the check button 209 is pressed, the CPU 108 executes predetermined image processing on the image 211 displayed on the preview region 202 and stores the image 211 after the image processing in the RAM 109. Then, the CPU 108 generates a difference image illustrating a difference between the pixel values of the images 211 before and after the image processing. FIG. 4 is a flowchart illustrating processing for generating a difference image. Programs corresponding to the below-described flowcharts in FIGS. 4, 5, 6, 8, 9, and 11 are included in the application software 101. The CPU 108 executes the programs on the RAM 109 to realize respective pieces of processing in FIGS. 4, 5, 6, 8, 9, and 11.

In step S401, the CPU 108 starts the processing in FIG. 4 when the check button 209 is pressed. Further, in step S401, the CPU 108 executes predetermined image processing on the image 211 and stores the image 211 after the image processing in the RAM 109 together with the image 211 before the image processing.

In step S402, the CPU 108 secures a memory of a size capable of storing an image including pixels of a number that is the same as a number of pixels of the image 211, and allocates the memory as a memory region of a difference image. In the present exemplary embodiment, a range of values settable as a pixel value is the same in the difference image and the image 211. Therefore, in step S402, a memory region of the same size as the memory region of the image 211 is secured.

In step S403, the CPU 108 firstly allocates the uppermost pixel in the image 211 as an index indicating a position in the height direction of the pixel as a processing target in the difference image. For example, in the application software 101, an XY coordinate system having an origin at the upper left of the image is defined as a two-dimensional coordinate system in the image 211 and the difference image. In step S403, at first, "Y=0" is set as a coordinate of the pixel as a processing target in the difference image. The index corresponds to the region in the RAM 109 where the pixel values of the pixels of the images 211 before and after image processing and the pixel values of the pixels of the difference image are stored.

In step S404, similar to the processing executed in step S403, the CPU 108 firstly allocates the leftmost pixel in the image 211 as an index indicating a position in the width direction of the pixel as a processing target in the difference image. In the above-described XY coordinate system, "X=0" is firstly set as the coordinate of the pixel as a processing target in the difference image.

In step S405, the CPU 108 acquires a pixel value of the pixel as a processing target in the image before image processing and a pixel value of the pixel as a processing target in the image after image processing according to the index values set in steps S403 and S404. Here, respective values of red, green, and blue (RGB) are acquired as the pixel values of the image. In step S406, the CPU 108 calculates a difference between pixels with respect to the RGB values acquired in step S405. In step S407, the CPU 108 stores an absolute value of the difference calculated in step S406 in the RAM 109. Specifically, in the memory region secured in step S402, the CPU 108 stores the absolute value of the difference in a region corresponding to the indexes set in steps S403 and S404.

In steps S408 and S409, the CPU 108 updates the positions in the width direction and the height direction in the image 211 and the difference image. Specifically, values of X and Y in the above-described XY coordinate system are incremented in steps S408 and S409. Through the processing in steps S404 and S408, the processing in steps S405 to S407 is executed on all of the pixels in the width directions of the image 211 and the difference image. Further, through the processing in steps S403 and S409, the processing in steps S404 to S408 is executed on all of the pixels in the height directions of the image 211 and the difference image. With this processing, a differential value before and after the image processing is calculated with respect to all of the pixels in the image 211, and the difference image is generated.

FIG. 5 is a flowchart illustrating calculation processing of a variation before and after the image processing. In step S501, the CPU 108 starts the processing in FIG. 5 when the difference image is generated through the processing in FIG. 4. In step S502, the CPU 108 determines the size of the image (here, called as "divided image") of each of the divided regions of the difference image according to the setting of the division number input region 208. Specifically, the CPU 108 divides the width (i.e., a number of pixels in the X-direction) of the difference image by a numerical value of the width direction set to the division number input region 208. Similarly, the CPU 108 divides the height (i.e., a number of pixels in the Y-direction) of the difference image by a numerical value of the height direction set to the division number input region 208. Then, the CPU 108 determines the number of pixels in the width direction and the height direction acquired through division with respect to the width direction and the height direction, as a size of the divided image.

In step S503, the CPU 108 attaches a divided image index for the divided image. Specifically, in the memory region in the RAM 109 where the difference image is stored, the CPU 108 defines an index for referring to the memory region corresponding to the divided image. Therefore, in step S503, with respect to each of pixels included in the difference image, information corresponding to the divided image including the pixel is allocated as a divided image index. For example, in a case where "2×2" is set to the division number input region 208 as a division number, any one of four types of information is attached to each of the pixels as the divided image index.

In step S504, the CPU 108 adds pixel values of all of the pixels in the specified divided image. Specifically, the CPU 108 acquires pixel values of the pixels to which the index of the specified divided image is attached, and adds the pixel values. Because the divided image is a part of the difference image, a variation before and after the image processing in a part of the region in the image 211 is calculated through the processing in step S504. In step S505, the CPU 108 stores the value calculated in step S504 in the RAM 109 in association with the divided image index. In step S506, the CPU 108 determines whether the processing in steps S504 and S505 has been ended with respect to all of the divided images. If the processing has not been ended with respect to all of the divided images (NO in step S506), the CPU 108 updates the divided image index to an index corresponding to the unprocessed divided image, and executes the processing in steps S504 and S505. When the processing in steps S504 and S505 ends with respect to all of the divided images (YES in step S506), the processing proceeds to step S507.

In step S507, the CPU 108 allocates data corresponding to the variation caused by the image processing to each of the divided images. Specifically, the CPU 108 calculates the formula, i.e., "added differential value in each divided image/(number of pixels in divided image×255)". A value of 0 to 1 is acquired as the calculated information, and the value becomes greater when the variation caused by the image processing is greater. The CPU 108 stores the above value as data corresponding to the variation, in association with the divided image index of the divided image.

Subsequently, a display which allows the user to check the variation caused by the image processing will be described. Based on the data corresponding to the variation allocated to the divided image in step S507, the CPU 108 determines a portion of a display target (output target) of the image 211. The CPU 108 further determines a display layout (output layout) of the determined portion of the display target (output target). Specifically, the CPU 108 arranges and displays, on the monitor 106, partial images before and after the image processing corresponding to the display target portion of the image 211. At this time, the display layout is determined so that regions of respective partial images compared by the user are arranged to continue in the vertical direction or the horizontal direction of the monitor 106.

Figure 3A:
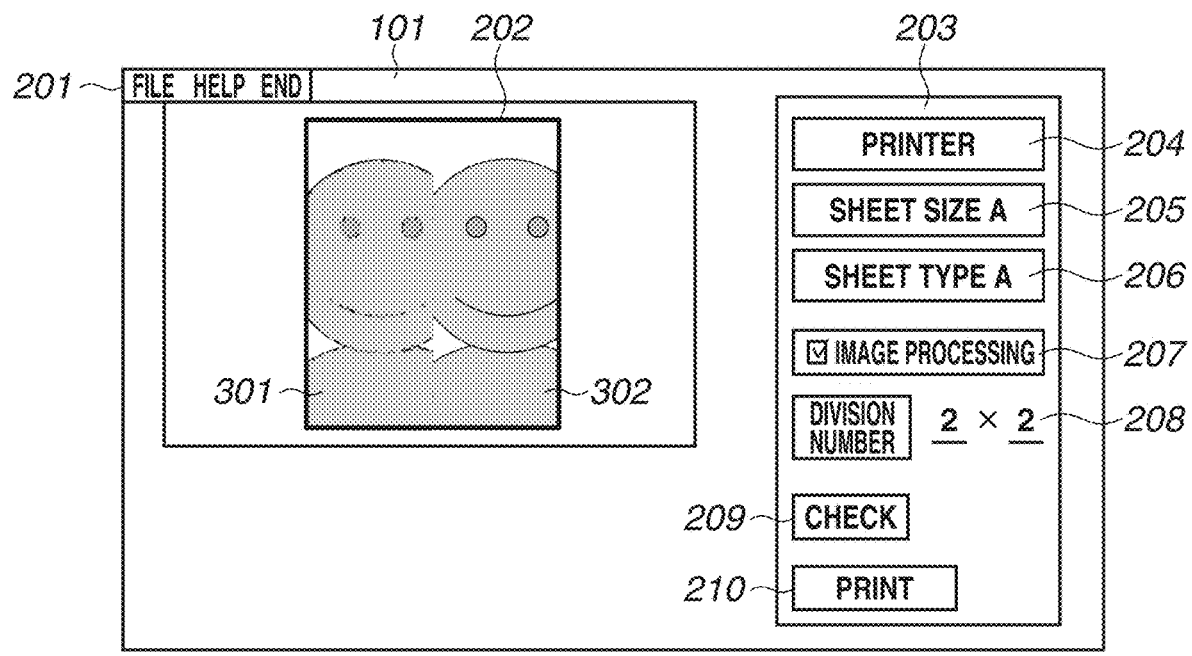
FIGS. 3A and 3B are diagrams illustrating examples of a display result for checking a variation caused by image processing.
Figure 3B:
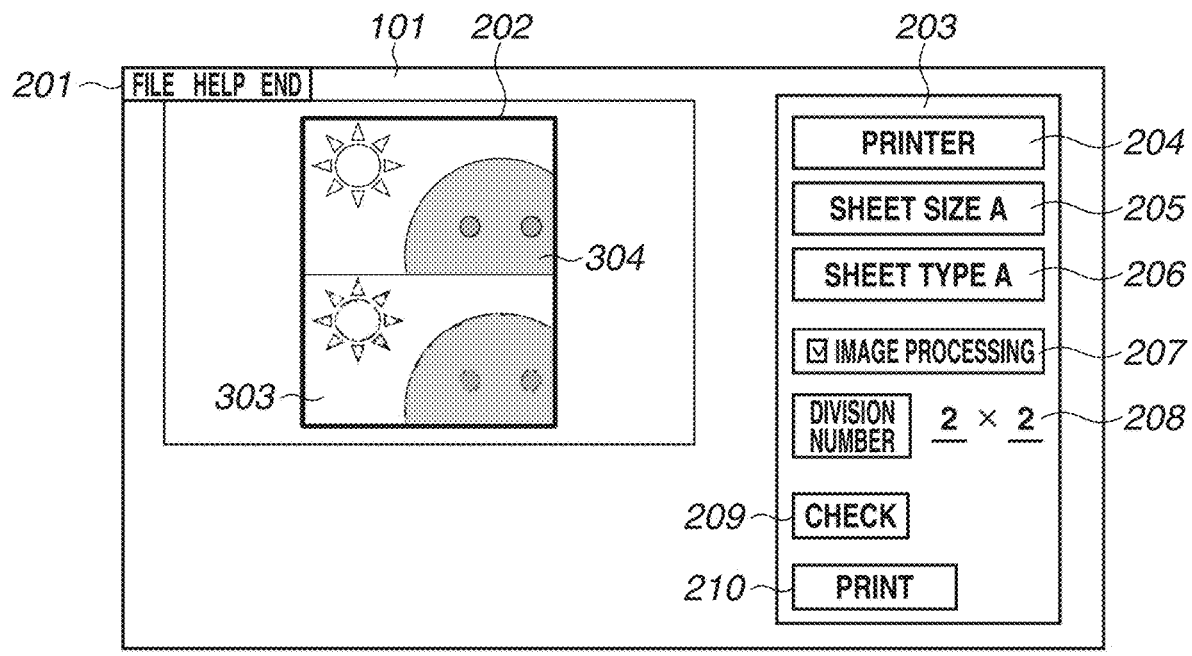

FIGS. 3A and 3B are diagrams illustrating examples of a display result for checking the variation caused by the image processing. FIG. 3A illustrates an example to be displayed when the variation in the right half region of the image 211 is determined to be greater through the analysis of the image 211 executed in the processing in FIG. 6 described below. Therefore, in FIG. 3A, a partial image 301 after the image processing and a partial image 302 before the image processing respectively are cut out from the images 211 before and after the image processing and displayed on the preview region 202. Further, in the preview region 202, because the partial images 301 and 302 are portrait images, portrait display regions are set with respect to the partial images 301 and 302, and a layout in which the partial images 301 and 302 are arranged in the lateral direction is determined as the display layout. As illustrated in FIG. 3A, image regions corresponding to the same object (e.g., eyes of a person) are arranged and displayed in the lateral direction in the preview region 202. Therefore, the user can easily check the variation of the images before and after the image processing.

Further, FIG. 3B illustrates an example to be displayed when the variation in the upper half region of the image 211 is determined to be greater through the analysis of the image 211 executed in the processing in FIG. 6 described below. Therefore, in FIG. 3B, a partial image 303 after the image processing and a partial image 304 before the image processing respectively are cut out from the images 211 before and after the image processing and displayed on the preview region 202. In the preview region 202, because the partial images 303 and 304 are landscape images, landscape display regions are set with respect to the partial images 303 and 304, and a layout in which the partial images 303 and 304 are arranged in the lengthwise direction is determined as the display layout. As illustrated in FIG. 3B, image regions corresponding to the same object (e.g., eyes of a person) are arranged and displayed in the lengthwise direction, so that the user can easily check the variation of the images before and after the image processing.

In addition, an output method of the display contents in the preview region 202 is not limited to a display. As another output method, printing may be executed. For example, when the print button 210 is pressed in a state illustrated in FIG. 3A or 3B, output control may be executed so that the display contents of the preview region 202 are printed by the printer 105 serving as an output apparatus different from the monitor 106. In other words, the partial images 301 and 302 or the partial images 303 and 304 may be printed by the printer 105 in addition to being displayed thereon, so that the printing result may be checked by the user. In this case, the partial images 301 and 302 or the partial images 303 and 304 are arranged and printed on a printing sheet in a layout corresponding to the layout in the preview region 202. Particularly, if contents of the image processing relate to a printing characteristic of the printer 105, the user can easily determine whether execution of the image processing is appropriate by checking the printing result.

Further, a button for inputting an instruction for printing the contents displayed on the preview region 202 may be arranged on the screen separately from the print button 210. In this case, when the print button 210 is pressed, the CPU 108 prints the image in FIG. 2B through the printer 105. Specifically, according to the contents set to the image processing application checkbox 207 when the print button 210 is pressed, the CPU 108 determines whether to apply the image processing with respect to the image 211 to printing processing. Then, according to the determination result, the image 211 on which the image processing is executed or the image 211 on which the image processing is not executed is transmitted to and printed by the printer 105.

Hereinafter, processing of determining a region of a display target in the image 211 displayed on a display in FIG. 3A or 3B will be described with reference to FIG. 6.

Figure 6:
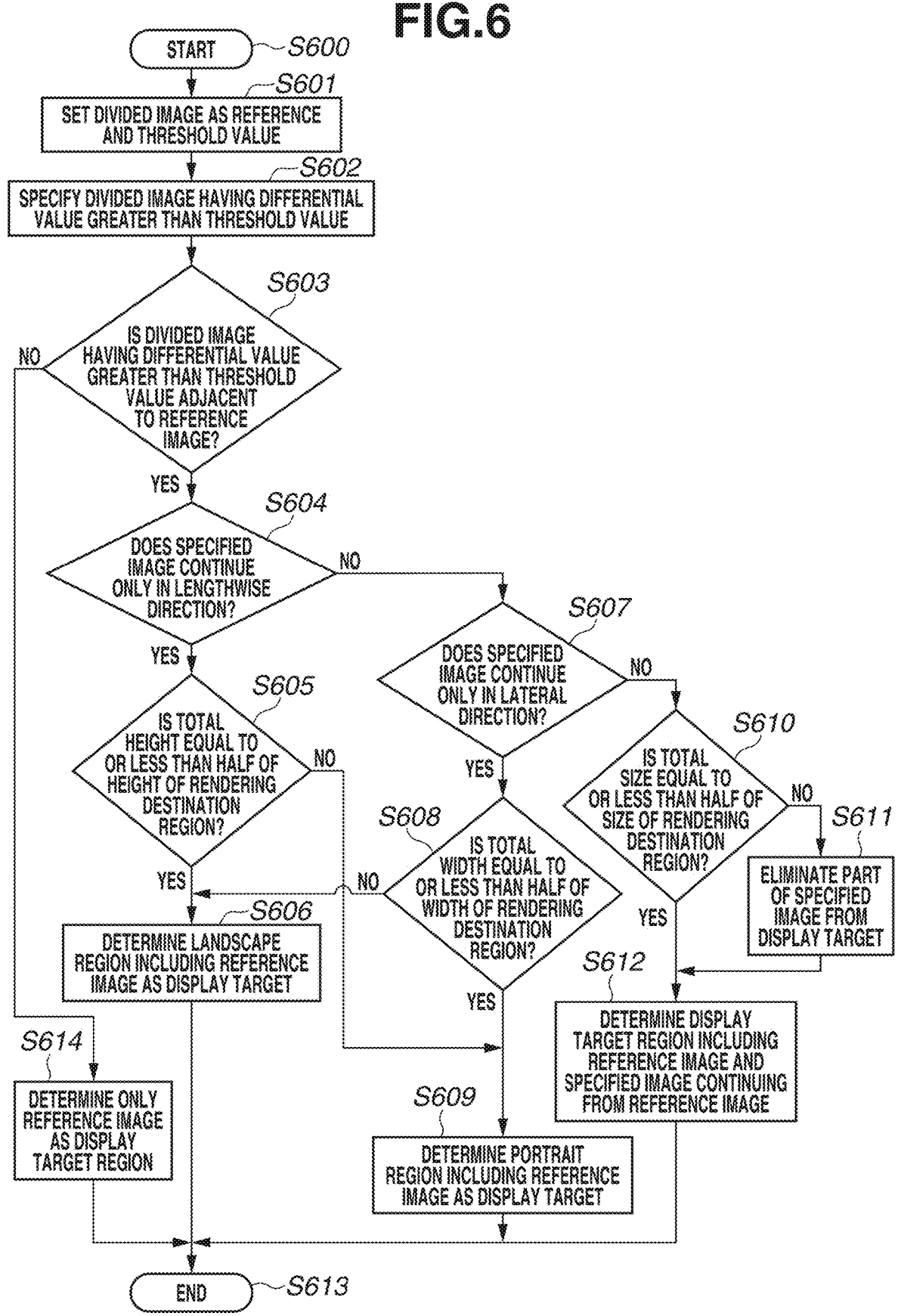
FIG. 6 is a flowchart s rating processing for determining a region of a display target in an image.

FIG. 6 is a flowchart illustrating processing of determining a display target region in the image 211. Specifically, the CPU 108 determines a portion of the display target in the image 211 from the data corresponding to the variation acquired in step S507. Here, the processing will be described with respect to the case where a region as a rendering destination is the preview region 202 having a size the same as the size of the image 211. However, the present exemplary embodiment is not limited to the above, and the processing in FIG. 6 may be employed when the partial image is rendered in a window of an application or in a region of a printing target printed through the application.

In step S600, the CPU 108 starts the processing illustrated in FIG. 6 when the processing in FIG. 5 has been completed. In step S601, the CPU 108 sets a threshold value with respect to data corresponding to the variation caused by the image processing set to each of the divided images in step S507 in FIG. 5. An optional value is determined as the threshold value through an optional method. In the following description, a value set to the divided image in step S507 is also called as "differential value". If the differential value is greater, a variation before and after the image processing is greater, i.e., an influence caused by the image processing is greater. In step S602, the CPU 108 further sets a partial image having the greatest differential value from among a plurality of partial images as a partial image taken as a reference for determining a display region (also called as "reference image). Further, a divided image to be a reference can be set as appropriate, so that "a partial image having a smallest differential value" or "a divided image selected by a user" may be set as a reference image instead of "a divided image having a greatest differential value".

In step S602, from among the plurality of partial images, the CPU 108 specifies a divided image having a differential value greater than the threshold value set in step S601. In step S603, the CPU 108 determines whether the divided image (also referred to as "specified image") having the differential value greater than the threshold value specified in step S602 is adjacent to the reference image.

In step S603, if the CPU 108 determines that the specified image is not adjacent to the reference image (NO in step S603), the processing proceeds to step S614. In step S614, the CPU 108 sets only the reference image as a region of the display target. On the other hand, in step S603, if the CPU 108 determines that the specified image is adjacent to the reference image (YES in step S603), the processing proceeds to step S604. In step S604, the CPU 108 determines whether the specified image continues only in a lengthwise direction from the reference image. If the specified image continues only in the lengthwise direction from the reference image (YES in step S604), the processing proceeds to step S605. In step S605, the CPU 108 determines whether a total height of the reference image and the specified image continuing in the lengthwise direction from the reference image is equal to or less than half of the height of the rendering destination region. If the total height thereof is equal to or less than half of the height of the rendering destination region (YES in step S605), the processing proceeds to step S606. In step S606, the CPU 108 determines a landscape region including the reference image as a display target. For example, a region in the image 211 including the reference image and the partial image continuing in the lengthwise direction from the reference image, having a height half the height of the image 211 and a width that is the same as the width in the lateral direction of the image 211, is determined as the display target.

On the other hand, if the specified image does not continue only in the lengthwise direction from the reference image (NO in step S604), the processing proceeds to step S607. In step S607, the CPU 108 determines whether the specified image continues only in the lateral direction from the reference image. If the specified image continues only in the lateral direction from the reference image (YES in step S607), the processing proceeds to step S608. In step S608, the CPU 108 determines whether a total width of the reference image and the specified image continuing in the lateral direction from the reference image is equal to or less than half of the width of the rendering destination region. If the total width thereof is equal to or less than half of the width of the rendering destination region (YES in step S608), the processing proceeds to step S609. In step S609, the CPU 108 determines a portrait region including the reference image as the display target. For example, a region in the image 211 including the reference image and the partial image continuing in the lateral direction from the reference image, having a width half the width of the image 211 and a height that is the same as the height in the lengthwise direction of the image 211, is determined as the display target.

In step S607, if the CPU 108 determines that the specified image does not continue only in the lateral direction from the reference image, i.e., if the specified image continues in both of the lengthwise direction and the lateral direction from the reference image, (NO in step S607), the processing proceeds to step S610. In step S610, the CPU 108 determines whether a total size of the reference image and the specified image continuing from the reference image is equal to or less than half the size of the rendering destination region. If the total size thereof is equal to or less than half the size of the rendering destination region (YES in step S610), the processing proceeds to step S612. In step S612, the CPU 108 determines a display target region which includes the reference image and the specified image continuing from the reference image. Further, in step S612, the CPU 108 also determines a region having a size half the size of the rendering destination region.

If the total size of the reference image and the specified image continuing from the reference image is not equal to or less than half the size of the rendering destination region (NO in step S610), the processing proceeds to step S611. In step S611, the CPU 108 eliminates a part of the specified image continuing from the reference image from the display target, and determines the display target region having a size half the size of the rendering destination region. For example, a partial image as an elimination target may be a partial image arranged at a position further away from the reference image. A display target region determined in step S611 may be a portrait region or a landscape region. For example, the CPU 108 determines a region in the orientation in which the specified image eliminated from the display target is less.

Figure 7:
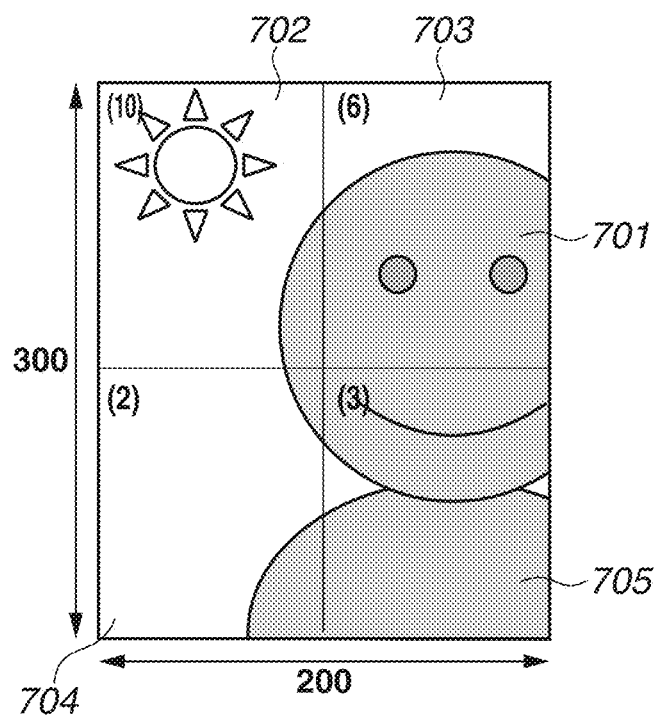
FIG. 7 is a diagram specifically illustrating the processing FIG. 6.

FIG. 7 is a diagram specifically illustrating the processing illustrated in FIG. 6. In FIG. 7, a numerical value described at the upper left of each of the divided images 702, 703, 704, and 705 represents a differential value of each of the regions 702 to 705. In the example in FIG. 7, the heights of the image 211 and the rendering destination region are specified as "Y=300" whereas the widths thereof are specified as "X=200". Further, in the division number input region 208, respective division numbers in the width direction and the height direction are set as "2", and an optional threshold value is set as "5" in step S601.

In the example in FIG. 7, the upper-left divided image 702 having the greatest differential value of 10 is set as the reference image in step S601. Then, in step S602, only the divided image 703 is specified as the specified image having the differential value greater than the threshold value of 5. Therefore, determination results in steps S603, S604, and S607 are "YES", "NO", and "YES", respectively, so that the processing in step S608 is executed. Because a total of the widths of the divided images 702 and 703 is 200 whereas the width of the rendering destination region is 200, a determination result in step S608 is "NO". Therefore, the processing proceeds to step S606. Then, in step S606, the upper-half landscape region in the image 211 which includes the divided images 702 and 703 is determined as the display target. In other words, the display target region illustrated in FIG. 3B is determined. Further, if the differential values of the divided images 703 and 704 are reversed, the left-half portrait region in the image 211 which includes the divided images 702 and 703 is determined as the display target in step S609. In other words, the display target region in FIG. 3A is determined.

Through the processing in FIG. 6, the maximum display target region including a partial image having a great difference caused by the image processing, i.e., a region including a partial image highly influenced by the image processing where the effect of the image processing can be easily recognized, is determined.

FIG. 11 is a flowchart illustrating display control processing for displaying the display target region determined in FIG. 6.

In step S1101, when the display target region is determined through the processing in FIG. 6, the CPU 108 starts the processing in FIG. 11. In step S1102, the CPU 108 determines whether the display target region is a portrait region. If the processing in step S609 in FIG. 6 is executed, or if a portrait region is determined as the display target region through the processing in steps S611 and S612 or the processing in step S614, the determination result in step S1102 in FIG. 11 is "YES". In step S1103, the CPU 108 displays the display target region in the image 211 after the image processing, determined through the processing in FIG. 6, on the left half of the preview region 202. Further, in step S1104, the CPU 108 displays the display target region in the image 211 before the image processing, determined through the processing in FIG. 6, on the right half of the preview region 202. Through the processing in steps S1103 and S1104, a display result in FIG. 3A is acquired.

On the other hand, if the determination result in step S1102 is "NO", the processing proceeds to step S1105. If the processing in step S606 in FIG. 6 is executed, or if a landscape region or a region having the same lengths in the lengthwise direction and the lateral direction is determined as the display target region through the processing in steps S611 and S612 or the processing in step S614, the determination result in step S1102 in FIG. 11 is "NO". Further, in step S1105, the CPU 108 displays the display target region in the image 211 after the image processing, determined through the processing in FIG. 6, on the lower half of the preview region 202. Further, in step S1106, the CPU 108 displays the display target region in the image 211 before the image processing, determined through the processing in FIG. 6, on the upper half of the preview region 202. Through the processing in steps S1105 and S1106, a display result in FIG. 3B is acquired.

In steps S1103 to S1106, if an aspect ratio of the display target region is different from that of a half of the preview region 202, an image to be displayed is reduced as appropriate so that the display target region can fit into the half of the preview region 202.

Through the processing in FIGS. 6 and 11, a region in the image where the variation caused by the image processing can be easily grasped is determined as the display target region. Further, as illustrated in FIGS. 3A and 3B, display target regions before and after the image processing are arranged in a layout in which the respective regions are arranged on a display screen in an orientation (portrait or landscape orientation) according to the aspect ratios thereof. Therefore, the user who looks at the display according to the present exemplary embodiment can easily compare the images before and after the image processing and easily grasp the effect of the image processing.

Further, there is a case where a size of the display target region determined through the processing in FIG. 6 is too small for the preview region 202. Therefore, the processing for adjusting the size of the display target region will be described.

Figure 8:
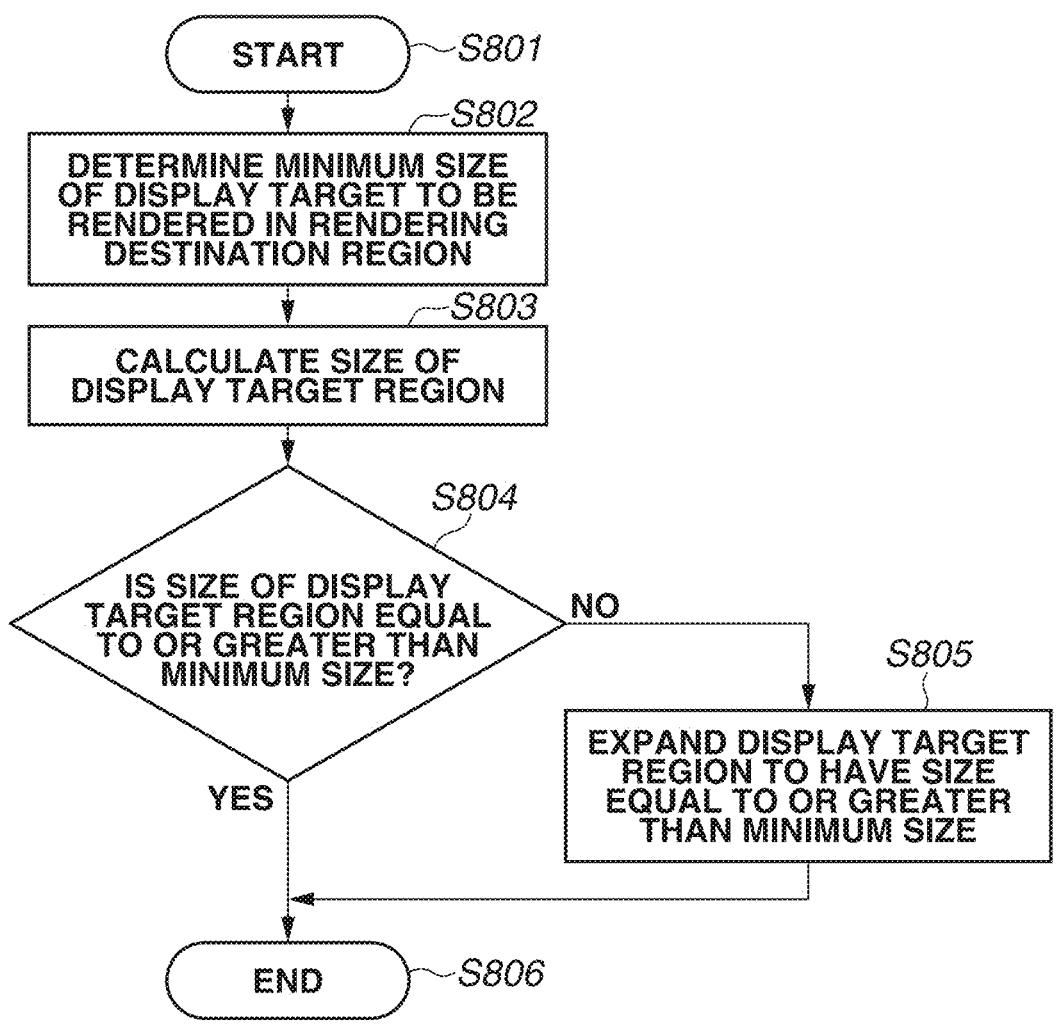
FIG. 8 is a flowchart illustrating processing for adjusting a size of a region of a display target.

FIG. 8 is a flowchart illustrating processing for adjusting a size of the display target region. When the processing in the flowchart of FIG. 6 has been executed, in step S801, the CPU 108 starts the processing in FIG. 8. In step S802, the CPU 108 determines a minimum size of the display target region rendered in the rendering destination target. An optional size may be determined as the minimum size, and a variable value such as "a size half the size of the rendering destination region" or a fixed value may be adopted.

In step S803, the CPU 108 calculates the size of the display target region determined through the processing in FIG. 6. In step S804, the CPU 108 determines whether the size calculated in step S803 is equal to or greater than the minimum size determined in step S802. If the size calculated in step S803 is the minimum size or more (YES in step S804), visibility of the preview display is likely to be secured with the current size of the display target region, so that the processing in. FIG. 8 is ended. On the other hand, if the size calculated in step S803 is less than the minimum size (NO in step S804), the processing proceeds to step S805. In step S805, the CPU 108 expands the display target region so that the size of the display target region becomes equal to or greater than the minimum size determined in step S802. In other words, a region eliminated from the display target region in FIG. 6 is also included as the display target. The display target region determined in FIG. 6 is included in the region expanded in step S805. After the processing in FIG. 8 is ended, the display control processing in FIG. 11 is executed.

In the above, the effect of the image processing has been checked with respect to one target image. However, the exemplary embodiment is not limited thereto, and the effect of the image processing may be displayed with respect to a plurality of images.

Further, when the display target region is displayed in FIG. 3A or 3B, a measurement result image illustrating a magnitude relationship between variations caused by the image processing appearing on a plurality of partial images may be displayed in a superimposed state.

Figure 9:
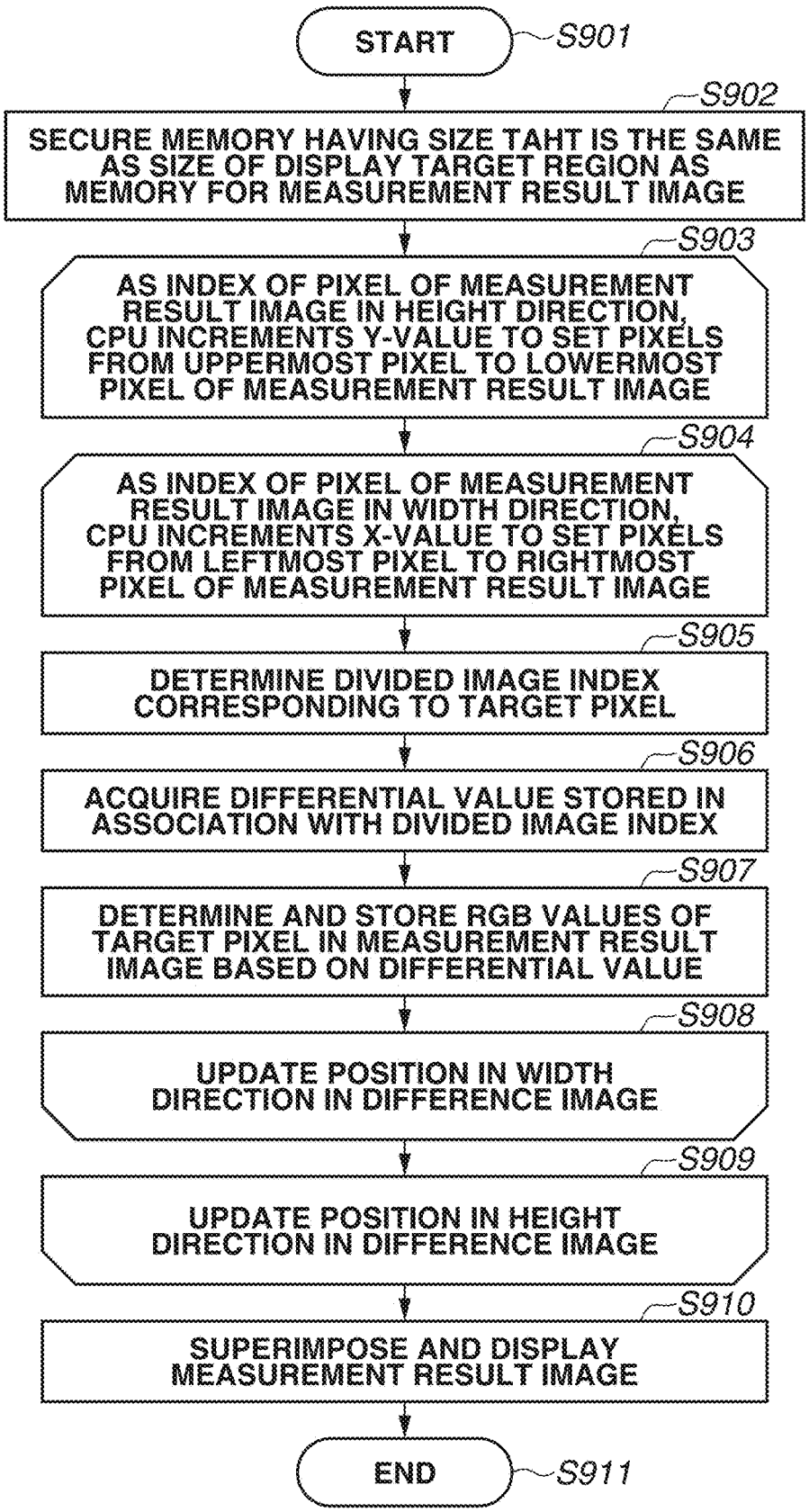
FIG. 9 is a flowchart illustrating processing for a display illustrating a variation caused by image processing.

FIG. 9 is a flowchart illustrating processing for displaying the variation caused by the image processing. When the display target region is determined through the processing in FIG. 6, in step S901, the CPU 108 starts the processing in FIG. 9. Through the processing in FIG. 9, the CPU 108 creates a measurement result image illustrating a variation caused by the image processing, which is to be superimposed and displayed on the display target region of the image 211, based on the above-described differential value. The processing will be described below in detail.

In step S902, the CPU 108 secures a memory having a size capable of storing the image having the pixels of a number that is the same as the number of pixels of the display target region in the RAM 109, and allocates the secured memory as a memory region for the measurement result image. In the present exemplary embodiment, a memory region having the size that is the same as the size of the memory region for the display target region is secured.

In steps S903 and S904, the CPU 108 sets the indexes indicating target pixel for calculating the pixel value in the measurement result image. In step S903, as the index of the pixel of the measurement result image in the height direction (Y-direction), the CRU 108 increments the Y-value to set the pixels from a leading end pixel (uppermost pixel) to a trailing end pixel (lowermost pixel) of the measurement result image. In step S904, as the index of the pixel of the measurement result image in the width direction (X-direction), the CPU 108 increments the X-value to set the pixels from a leading end pixel (leftmost pixel) to a trailing end pixel (rightmost pixel) of the measurement result image. Through the below-described processing in step S908 and S909, the processing in steps S905 to S907 is executed on all of the pixels in the divided images, and the RGB values are set to all of the pixels in the measurement result image.

In step S905, the CPU 108 determines a divided image index corresponding to the target pixel based on the indexes set in steps S903 and S904. As illustrated in FIG. 5, a divided image index is allocated to each of the pixels in the image 211. Therefore, for example, in step S905, the CPU 108 specifies a pixel included in image 211 positioned at the X-coordinate and the Y-coordinate of the target pixel included in the measurement result image. Then, the CPU 108 determines the divided image index allocated to the specified image. In step S906, the CPU 108 refers to the added value stored in step S505 in FIG. 5 to acquire the differential value stored in association with the divided image index determined in step S905.

In step S907, the CPU 108 determines the RGB values of the target pixel included in the measurement result image based on the differential value acquired in step S906. Then, the CPU 108 stores the RGB values a region corresponding to the target pixel in the memory region secured in step S902. In addition, various methods may be used for the determination method of the RGB values in step S907. For example, the RGB values are determined so that density of the color becomes higher when the differential value is greater. At this time, the RGB values may be set to be equal to each other (R=G=B), so that the measurement result image is expressed in gray scale. Alternatively, only a value of the R-component may be set, or weights are set to the respective RGB components, and values based on the weights may be set.

In steps S908 and S909, the CPU 108 respectively increments the X-value and the Y-value of the target pixel in the measurement result image and sets a new target pixel. Through the loop of processing in steps S903, S904, S908, and S909, all of the pixels in the measurement result image are set as the target pixels, and the processing in steps S905 to S907 is executed. Therefore, when the processing in steps S902 to S909 has been completed, the RGB values of all of the pixels in the measurement result image are stored, and the measurement result image is generated.

In step S910, the CPU 108 executes display control for superimposing and displaying the measurement result image generated through the processing in steps S902 to S909 on the display target regions in the images 211 before and after the image processing. Specifically, the CPU 108 combines the measurement result image with the display target region in the image 211, as a transmissive image. Then, the CPU 108 controls the monitor driver 104 to display the acquired combined image on the monitor 106. Known processing may be employed with respect to the processing of combining the measurement result image as a transmissive image, and thus detailed description be omitted. Through the above-described combining processing, the measurement result image is superimposed and displayed on the display target region in the image 211 as a translucent image.

Figure 10:
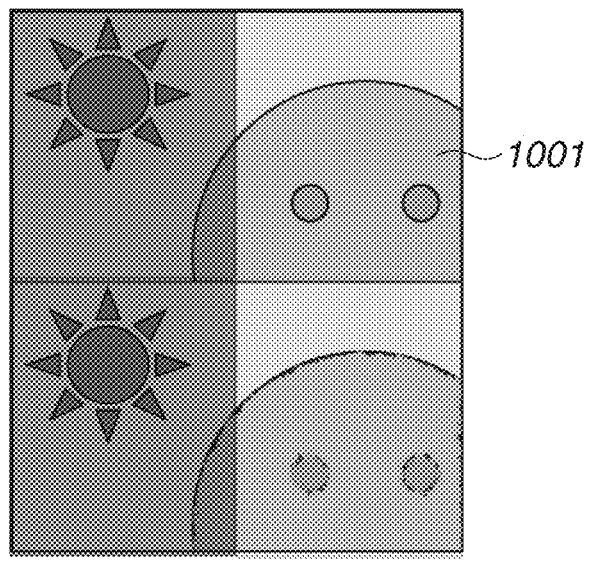
FIG. 10 is a diagram illustrating a result of superimposed display of a measurement result image.

FIG. 10 is a diagram illustrating a result of superimposed display of the measurement result image. In the display in FIG. 10, images in different colors are respectively superimposed and displayed on the partial image having a great variation caused by the image processing and the partial image having a small variation caused by the image processing. Therefore, the user who looks at the display in FIG. 10 can recognize the magnitude relationship between variations caused by the image processing appearing on the divided images in the display target region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-232932, filed Dec. 4, 2017, which is hereby incorporated by reference herein in its entirety.

What is claimed is:

1. An information processing method, performed by at least one processor, for outputting an image from an output apparatus, the method comprising:

executing, through image processing, predetermined image processing on a predetermined image;

setting, as a reference divided image, one of a plurality of divided images out of the predetermined image;

determining a region of an output target in the predetermined image such that the region of the output target includes the reference divided image based on information about a variation caused by the predetermined image processing executed on the predetermined image in the image processing;

determining, based on adjacency of a particular divided image to the reference divided image, the region of the output target such that the reference divided image and the particular divided image are included in the region of the output target, wherein the particular divided image is one among the plurality of divided images, and the particular divided image corresponds to a variation that is greater than a predetermined threshold, and the particular divided image is not identical to the reference divided image, in a case where the particular divided image is not adjacent to the reference divided image, determining the region of the output target such that the reference divided image is included in the region of the output target and the particular divided image is not included in the region of the output target;

determining whether a size of the region of the output target is determined to be smaller than a predetermined size or not;

in a case where the size of the target of the output target is determined to be smaller than the predetermined size, expanding the determined region of the output target such that the determined region of the output target includes a divided image that is one among the plurality of divided images and corresponds to a variation less than the predetermined threshold and is adjacent of the reference divided image; and in a case where the size of the region of the output target is determined to be smaller than the predetermined size, outputting, from the output apparatus through output control, a first image corresponding to the region of the output target that has been expanded in the predetermined image on which the predetermined image processing is not executed through the image processing, and a second image corresponding to the region of the output target that has been expanded in the predetermined image on which the predetermined image processing is executed through the image processing, and in a case where the size of the region of the output target is determined to be smaller than the predetermined size, outputting, from the output apparatus through output control, a first image corresponding to the region of the output target that has been expanded in the predetermined image on which the predetermined image processing is not executed through the image processing, and a second image corresponding to the region of the output target that has not expanded by the expanding in the predetermined image on which the predetermined image processing is executed through the image processing.

2. The information processing method according to claim 1, wherein the variation caused by the predetermined image processing is acquired at each of the plurality divided images divided out of the predetermined image, and based on the acquired variations, a divided image corresponding to a greatest variation among the plurality of divided images is set as the reference divided image.

3. The information processing method according to claim 1, wherein, in the image processing, image processing according to an image output characteristic of an output apparatus different from the output apparatus is executed as the predetermined image processing.

4. The information processing method according to claim 3, wherein, in the image processing, image processing according to an image printing characteristic of a printing apparatus as the output apparatus is executed.

5. The information processing method according to claim 1, wherein, in the output control, the first image and the second image are output from the output apparatus so that a relationship between a first variation in a first region and a second variation in a second region is expressed in the first image or the second image.

6. The information processing method according to claim 5, wherein, in the output control, a measurement result image in which a pixel having a first pixel value based on the first variation is arranged at a position corresponding to the first region and a pixel having a second pixel value based on the second variation is arranged at a position corresponding to the second region is output.

7. The information processing method according to claim 6, wherein, in the output control, the measurement result image is output so as to be superimposed on the first image or the second image.

8. The information processing method according to claim 1, wherein, in the output control, the first image and the second image are output so that the first image and the second image are output and arranged in a lateral direction of the first image and the second image when an aspect ratio of the region of the output target is in a portrait orientation, and the first image and the second image are output and arranged in a lengthwise direction of the first image and the second image when the aspect ratio of the region of the output target is in a landscape orientation.

9. The information processing method according to claim 1, wherein the output apparatus is a display apparatus, and wherein, in the output control, the first image and the second image are displayed by the display apparatus.

10. The information processing method according to claim 1, wherein the output apparatus is a printing apparatus, and wherein, in the output control, the first image and the second image are printed by the printing apparatus.

11. The information processing method according to claim 1, wherein, in the output control, the first image and the second image are output so that the first image and the second image are arranged to be output from the output apparatus in an output layout according to a shape of the region of the output target determined by the determining.

12. The information processing method according to claim 1, wherein a divided image selected from among the plurality of divided images by a user is set as the reference divided image.

13. An information processing apparatus for outputting an image from an output apparatus comprising:
   at least one processor,
   wherein the at least one processor performs:
   executing predetermined image processing on a predetermined image;
   setting, as a reference divided image, one of a plurality of divided images divided out of the predetermined image;
   determining a region of an output target in the predetermined image such that the region of the output target includes the reference image based on information about a variation caused by the predetermined image processing executed on the predetermined image;
   based on adjacency of particular divided image to the reference divided image, determining the region of the output target such the reference divided image and the particular divided image are included in the region of the output target, wherein the particular divided image is one among the plurality of divided images, and the particular divided image corresponds to a variation that is greater than a predetermined threshold, and the particular divided image is not identical to the reference divided image, and
   wherein, in a case where the particular divided image is not adjacent to the reference divided image, the region of the output target is determined such that the reference divided image is included in the region of the output target and the particular divided image is not included in the region of the output target,
   determining whether a size of the region of the output target determined by the determining is smaller than a predetermined size or not;
   in a case where the size of the region of the output target is determined to be smaller than the predetermined size, expanding the region of the output target such that the region of the output target includes a divided image that is one among the plurality of divided images and corresponds to a variation that is less than the predetermined threshold and is adjacent to the reference divided image;
   in a case where the size of the region of the output target is determined to be smaller than the predetermined size, outputting a first image of the region corresponding to the output target that has expanded in the predetermined image on which the predetermined image processing is not executed, and a second image corresponding to the region of the output target that has expanded in the predetermined image on which the predetermined image processing is executed, from the output apparatus, and
   in a case where the size of the region of the output target is determined to be smaller than the predetermined size, outputting, from the output apparatus through output control, a first image corresponding to the region of the output target that has not expanded in the predetermined image on which the predetermined image processing is not executed through the image processing, and a second image corresponding to the region of the output target that has not expanded in the predetermined image on which the predetermined image processing is executed through the image processing.

14. A non-transitory computer-readable storage medium storing a program which causes a computer to execute an information processing method for outputting an image from an output apparatus, the information processing method comprising:

executing, through image processing, predetermined image processing on a predetermined image;

setting, as a reference divided image, one of a plurality of divided images divided out of the predetermined image;

determining a region of an output target in the predetermined image such that the region of the output target includes the reference image based on information about a variation caused by the predetermined image processing executed on the predetermined image;

based on adjacency of particular divided image to the reference divided image, determining the region of the output target such the reference divided image and the particular divided image are included in the region of the output target, wherein the particular divided image is one among the plurality of divided images, and the particular divided image corresponds to a variation that is greater than a predetermined threshold, and the particular divided image is not identical to the reference divided image, and wherein, in a case where the particular divided image is not adjacent to the reference divided image, the region of the output target is determined such that the reference divided image is included in the region of the output target and the particular divided image is not included in the region of the output target, determining whether a size of the region of the output target determined by the determining is smaller than a predetermined size or not;

in a case where the size of the region of the output target is determined to be smaller than the predetermined size, expanding the region of the output target such that the region of the output target includes a divided image that is one among the plurality of divided images and corresponds to a variation that is less than the predetermined threshold and is adjacent to the reference divided image;

in a case where the size of the region of the output target is determined to be smaller than the predetermined size, outputting a first image of the region corresponding to the output target that has expanded in the predetermined image on which the predetermined image processing is not executed, and a second image corresponding to the region of the output target that has expanded in the predetermined image on which the predetermined image processing is executed, from the output apparatus, and in a case where the size of the region of the output target is determined to be smaller than the predetermined size, outputting, from the output apparatus through output control, a first image corresponding to the region of the output target that has not expanded in the predetermined image on which the predetermined image processing is not executed through the image processing, and a second image corresponding to the region of the output target that has not expanded in the predetermined image on which the predetermined image processing is executed through the image processing.

* * * * *